United States Patent Office 3,819,772
Patented June 25, 1974

3,819,772
METHOD OF MAKING THIN DEFECT-FREE SILICONE RUBBER FILMS AND MEMBRANES
Theodor Kolobow, Rockville, Md., assignor to the United States of America as represented by the Secretary, Department of Health, Education, and Welfare
No Drawing. Filed Feb. 23, 1973, Ser. No. 335,155
Int. Cl. A62b 7/00
U.S. Cl. 264—22
10 Claims

ABSTRACT OF THE DISCLOSURE

A method of making thin defect-free silicone rubber films and membranes which comprises forming a dispersion of a silicone rubber stock compounded with reinforcing filler material, centrifuging the dispersion so as to remove therefrom undispersed filler aggregates, casting a film of the centrifuged dispersion onto a releasable carrier substrate, evaporating the solvent from the film, and curing the film. The film may thereafter be subjected to a post-cure with ultraviolet radiation which significantly increases its tensile strength and burst strength and decreases its elongation.

This invention relates to a method of making thin, defect-free silicone rubber films and membranes.

A membrane artificial lung was first used during clinical cardiopulmonary bypass in 1956. Its introduction to clinical medicine was based on growing evidence that animals fare better postoperatively after bypass on a membrane artificial lung than after bypass on a bubble or disc oxygenator. Fat emboli, microembolic insults, and damage to blood proteins and lipoproteins appear to be the result of prolonged perfusion using blood-gas interface oxygenator systems. Conversely, membrane oxygenators are suitable for long-term use, for they avoid the complications of a blood-gas interface.

Since 1968, reports on long-term (up to two weeks) animal perfusions using the membrane lung have appeared in the literature. A number of long-term extracorporeal perfusions in man have recently been reported, the longest lasting 10 days. Reports on short-term use of the membrane lung in open heart surgery are also encouraging.

Despite these optimistic reports, clinical application of the membrane lung remains limited today, and it will remain so until the device is made as consistently reliable and as practical as presently used bypass machines.

The story of the membrane lung is one involving membrane leaks and ruptures. No matter how excellent the membrane lung design (and a number of designs are perfectly adequate), a hole or a tear in a defective membrane may flood the device and render it useless.

In recent years silicone rubber membrane has become accepted over membranes used earlier, such as cellophane, polyethylene, and fluorocarbon films. The gas transfer properties of silicone rubber are incontestably excellent. In spite of its low tear strength and low tensile strength, it remains highly usable if care is taken in the manufacture of the silicone rubber film.

Extensive use of silicone rubber membranes for these purposes, however, has been prevented due to the frequent occurrence of membrane leaks and ruptures. Although this is caused to some extent by the relatively low tear strength and tensile strength of membranes of such thinness, the primary reason for membrane failure has been the pinholes and weak spots which frequently are formed in the membrane during the manufacture thereof.

It is, therefore, a primary object of this invention to provide a method of making thin silicone rubber films and membranes which are substantially defect-free, i.e., having no pinholes or pores or weak spots which may become holes.

Another object of the invention is to provide a method of making thin, defect-free silicone rubber films and membranes exhibiting increased tensile strength and burst strength.

Other objects of the invention will become more apparent from the discussion below.

The foregoing objects are attained by means of a process comprising dispersing in an organic solvent an organopolysiloxane convertible to the cured, solid, elastic state, and which has been compounded with reinforcing filler material; centrifuging the dispersion so as to remove therefrom undispersed filler aggregates; casting a film of the centrifuged dispersion onto a releasable carrier substrate; evaporating the solvent from the film; and curing the film to the solid, elastic state. The film is thereafter preferably subjected to a post-cure with ultraviolet radiation which significantly increases its tensile strength and burst strength and decreases its elongation.

The organopolysiloxanes used in the present method are well-known polymeric materials of units of the average formula

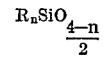

wherein each R is a monovalent hydrocarbon radical or a halogenated monovalent hydrocarbon radical and $n$ has a value of 1.9 to 2.1 and preferably 1.99 to 2.01.

In the above formula, R can be any monovalent hydrocarbon radical including alkyl radicals such as methyl, ethyl and octadecyl; aryl radicals such as phenyl and anthracyl; alkaryl radicals such as tolyl, xylyl and methylnaphthyl; aralkyl radicals such as benzyl and phenylethyl; cycloaliphatic radicals such as cyclopropyl and cyclopentyl; and alkenyl radicals such as vinyl, alkyl and octadecenyl. R can also represent any halogenated derivatives of the foregoing listed monovalent hydrocarbon radicals including chloromethyl, bromophenyl, iodotolyl, perchlorophenylethyl, perchlorovinyl, chlorofluorovinyl, 3,3,3-trifluoropropyl, and so forth. The radicals represented by R can be all the same or they can be different. The operative polymers can be homopolymers such as polymers made up entirely of dimethylsiloxane units or of methylvinylsiloxane units, or they can be copolymers of various units such as methylvinylsiloxane units and dimethylsiloxane units. Polymers used by me and found to provide satisfactory results are General Electric's numbers 404, 406, 421 and 505, Dow Corning's numbers 1125, S–2000, S9711, and 51125, and Union Carbide's numbers W96, W982, and KW1300.

Silicone polymers are compounded into silicone rubber stocks by adding reinforcing fillers and various processing aids normally employed as additives in silicone rubber stocks, and mixing them together on a rubber mill. Useful as fillers are such materials as fumed silica, silica aerogels and acetylene carbon black. The amount of filler used with the organopolysiloxane may be varied widely within wide limits and, on a weight basis, may be of the order of from about 10 to 30 or more parts filler per part organopolysiloxane.

In preparing the dispersion of the silicone rubber stock, any suitable organic solvent can be employed, such as aliphatic or aromatic hydrocarbons, non-flammable chlorinated solvents, and the like. The particular solvent employed is not material, although toluene has been found to be particularly suitable since it has a high solubility for organic peroxide curing catalysts and avoids bleeding of the catalyst to the film surface during solvent evaporation.

The freshly milled and finely cut rubber stock is swelled overnight in the desired solvent and is thereafter dispersed in a propeller type mixer, a Z-blender, or a dough mixer. Solvent is slowly added until the final desired rubber concentration is reached, which may be anywhere within the range of from about 5 to 60%. Lower concentrations, e.g., 20% or less, can be dispersed in a colloid mill after overnight swelling.

At this point the dispersions are generally filtered through an 80–140 mesh sieve, which removes undispersed silicone rubber stock and fibrinous strands. However, such filtration does little to remove undispersed reinforcing filler aggregates. Reinforcing fillers, which have a mean particle size of less than 100 Angstroms, tend to be inadequately dispersed by the rubber mill and form many large colloidal aggregates in dispersion, which aggregates contain a very high ratio of filler to polymer. These aggregates have been found to be the primary causative agents of pinholes and weak spots in films and membranes formed from such dispersions. The use of finer mesh sieves has little effect on removing such aggregates and markedly slows down filtering.

In accordance with the present invention, it has been found that by centrifuging silicone rubber dispersions, it is possible to selectively remove these reinforcing filler aggregates of high specific gravity without affecting the finely dispersed filler. Films and membranes made from the supernatent rubber dispersion following centrifugation contain sufficient reinforcing filler to yield excellent rubber of high quality, and are substantially free of pinholes and weak spots. The centrifugation force required to remove the undispersed dense agregates is a function of the dispersion viscosity and time. It has been found that, depending on dispersion viscosity, anywhere from 30 minutes to 20 hours of centrifugation at 10,000 g. may be required, with 4 hours generally being adequate. Centrifuged dispersions should be used promptly for best results or else "aging" with gel formation may occur.

The centrifuged silicone rubber dispersion is then cast onto a releasable carrier substrate to form a film thereon. A suitable carrier substrate should be mechanically strong to permit weight loading and resist deformation, should provide excellent heat conduction for proper drying and curing, have low specific heat, be inexpensive, and not generate static discharge potential. Most important, it should have superior release properties both in air and in inert gas. Pure aluminum foil, either in zero temper or H18 temper, meets all these requirements. Such foil is available in any desired width and may be considered disposable. Other materials which can be used as the carrier substrate include polished SS#304 stainless steel foil, fluorocarbon materials such as polyfluoroethylenepropylene and polytetrafluoroethylene, and polyester film, preferably aluminized or treated with a release agent.

Although casting of the film may be done in a single layer, a double layer casting technique is the preferred approach. This involves casting one thin layer, evaporating the solvent, and casting a second layer on top of the first. The solvent in the second layer is evaporated and both sections are cured together. More than two layers can be deposited in this way. Bonding between the layers is excellent. The advantage of using the double layer casting technique lies in the improbability of superimposing two pinholes or weak spots. Although the centrifugation step eliminates the major cause of pinhole formation, the double layer casting technique provides additional assurance of obtaining defect-free films.

The film is preferably provided with fabric reinforcement to strengthen its physical properties. This is easily accomplished by draping a woven or non-woven fabric such as unsized polyamide, polyester or fiberglass fabric onto the cast dispersion. In low concentration rubber dispersions, e.g., around 20% or less, the fabric generally wets immediately and must be completely wetted, i.e., immersed in the rubber, before solvent evaporation begins. When a double layer casting technique is employed, the fabric reinforcement is generally contained in the second layer.

Evaporation of the solvent from the film should be carried out at a rate, temperature and pressure such as to avoid bubble formation in the film. In general, the optimum temperature range for dispersions in toluene is about 75–80° C. for non-reinforced film and about 70–75° C. for fabric reinforced film. Air or nitrogen flow at these temperatures should be high enough to remove vapors adequately at safe concentrations.

Curing of the silicone rubber film to the solid, elastic state may be carried out either by high energy radiation, as from a Van de Graaff generator, at ambient temperatures and without a curing catalyst, or by heating at elevated temperatures in the presence of curing catalysts such as organic peroxides. Among such curing catalysts may be mentioned, for instance, benzoyl peroxide, 2,4-dichlorobenzoyl peroxide, tertiary butyl perbenzoate, etc. These curing catalysts can be present in amounts ranging from about 0.1 to 8%, preferably 2 to 6%, by weight, based on the weight of the organopolysiloxane, and are generally added to the silicone rubber dispersion after the centrifuging step and prior to casting the film. Curing with the catalysts is effected by heating the film to temperatures within the range of from about 125 to about 180° C. for a period ranging from about 1 to about 6 minutes. Curing under a nitrogen atmosphere generally results in the film having higher tensile strength and burst strength and lower elongation as compared with curing in air. With fabric reinforced silicone rubber films, however, cure under nitrogen reduces fabric adhesion to the silicone rubber. It is preferable, therefore, to cure fabric reinforced silicone rubber film in air. When high energy radiation is used to cure the film, it may be accomplished in air or under nitrogen. The radiation should be in the order of about $10^7$ rep, although lower energies can be used if done in conjunction with a catalyst.

Following the curing step as described above, the silicone rubber film is preferably subjected to a post-cure with ultraviolet radiation, as from a germicidal lamp having a continuous emission spectrum around 2537A. Such ultraviolet irradiation post-cure significantly increases the tensile strength and burst strength and decreases the elongation of the silicone rubber film, particularly where the initial curing of the film has been carried out in air. The change is more pronounced when the irradiation is effected under nitrogen than in air. The length and intensity of exposure may usually be varied over fairly wide limits without appreciable change in the quality of the product, the major effect being obtained after only about one minute of exposure. This phenomenon is somewhat surprising since silicone rubber polymer cannot be effectively crosslinked with ultraviolet irradiation in the absence of another catalyst, and ultra-violet-activated organic peroxide catalysts produce an inferior rubber compared to silicone rubber catalyzed by heat-activated organic peroxides. The mechanism for this phenomenon may lie in ultraviolet activation of reactive sites which were formed during initial cure. Interestingly enough, ultraviolet irradiation need not be performed immediately, but can be accomplished even weeks or months later.

Ultraviolet radiation for post-cure of silicone rubber film may be successfully applied to thin films only. A 5 mil membrane absorbs nearly 90% of the total radiant energy at the dominant wavelength for germicidal lamps (2437A). Such radiation has little effect on thicker membranes and, in fact, a non-homogeneous dose (and thereby a non-homogenous cure) may weaken a thick membrane.

In order that those skilled in the art may better understand how this invention may be practised, the following examples are given by way of illustration and not by way of limitation. All parts and percentages in the examples are based on weight unless otherwise indicated. In the examples, tensile strength of the film is measured by stretching a ½-inch wide strip of the film to yield 600% elongation per minute and recording tension at break with a Statham Universal strain gauge. Elongation of the film is reported as the percent increase in length at break over resting length. Burst strength of the film is reported as that vacuum (in mm. Hg below ambient) which, when applied to the film over a 2.8 cm. diameter orifice at a rate of 100 mm. Hg/15 sec., causes the film to burst.

EXAMPLE 1

A silicone rubber stock comprising a methylvinyl polysiloxane gum compounded with a fumed silica filler was finely cut and swelled overnight in a toluene solvent and was thereafter dispersed in a propeller type mixer to form a 20% silicone rubber dispersion. The dispersion was filtered through an 80–140 mesh sieve to remove undispersed silicone rubber stock and fibrinous strands, and was then centrifuged for 20 hours at 10,000 g., whereby undispersed silica filler aggregates were separated out from the dispersions. To the supernatent rubber dispersion was added 2% 2,4-dichlorobenzoyl peroxide, based on the weight of the rubber. The dispersion was then cast under a doctor blade onto a moving aluminum foil carrier. The resulting film was dried at about 75° C. for 6 minutes to evaporate the toluene solvent therefrom, and was then cured in air for 6 minutes at 180° C. The cured film, 5 mils in thickness, was removed from the aluminum foil carrier and was observed by light microscopy to have a highly uniform pinhole-free appearance. Tensile strength, burst strength and elongation measurements made on several different areas of the film varied by about ±5%, indicating a highly uniform film. The film had an average tensile strength of 1000 p.s.i., an average burst strength of 300 mm. Hg, and an average elongation of 770%.

EXAMPLE 2

Example 1 was repeated, but this time the cured film was further subjected to an ultraviolet irradiation post-cure for 6 minutes, using two ultraviolet G.E. 15W germicidal lamps, 3 inches above the film. The post-cured film had an average tensile strength of 1300 p.s.i., an average burst strength of 390 mm. Hg, and an average elongation of 700%.

EXAMPLE 3

Example 1 was repeated, with the exception that the centrifugation step was omitted for purposes of comparison. The resulting cured film was observed by light microscopy to have a non-uniform appearance exhibiting surface mounds and pits and numerous pinholes. Tensile strength, burst strength and elongation measurements made on several different areas of the film varied by as much as 80%, indicating a non-uniform film.

As shown by the foregoing examples, the centrifugation step is highly critical to obtaining high quality uniform thin silicone rubber films and membranes which are substantially defect-free. Furthermore, the ultraviolet irradiation post-curing step provides the film with an increase in tensile strength of 30%, an increase in burst strength of 30%, and a decrease in elongation of about 10%.

EXAMPLE 4

Studies were performed in alert sheep suitably connected for extracorporeal blood gas exchange with the Mini-Lung in a veno-venous mode. The animals received 1 mg./(kg.) (hr.) heparin by continuous infusion. Membranes were cast from silicone rubber dispersions and all were fabric reinforced. To test the possibility of using high energy radiation to prepare hypothrombogenic membranes, a 20% methyl-vinyl silicone rubber dispersion was cast, sprayed with heparin-TDMAC complex, and cured with 10 Mrep (Van de Graaff) under nitrogen. Flow was initiated at 15 cc./min., and perfusion pressures were continuously recorded. Membrane envelopes were opened after perfusion pressure began to rise, or after one hour. The following results were observed.

A. Control: commercial membrane. Within one minute following the onset of blood flow, perfusion pressure starts to rise; it doubles within the next 20 minutes. Opening the membrane envelope, one finds a huge confluent gelatinous sheet of thrombus.

B. Silicone rubber membrane with 2% 2,4-dichlorobenzoyl peroxide cured at 180° C. and ultraviolet post-cured under nitrogen.

A 20% rise in perfusion pressure occurs after one hour. Only a few specks of fibrin are seen when the membrane envelope is opened.

C. Hypothrombogenic membrane: silicone rubber and heparin-TDMAC complex cured with high energy radiation.

No rise in perfusion pressure occurs during one hour of perfusion. After opening the membrane envelope no thrombus or fibrin deposits are seen. Such membrane, when cured with 2,4-dichlorobenzoyl peroxide, does not show any hypothrombogenic effect.

What is claimed is:

1. A method of making thin, defect-free silicone rubber films, which comprises:
    (a) dispersing in an organic solvent an organopolysiloxane convertible to the cured, solid, elastic state, and which has been compounded with reinforcing filler material;
    (b) centrifuging the dispersion to remove therefrom undispersed filler aggregates;
    (c) casting a film of the centrifuged dispersion onto a releasable carrier substrate;
    (d) evaporating said solvent from said film; and
    (e) curing said film to the solid, elastic state.

2. The method as defined in claim 1 which further includes the step of subjecting the cured film to a post-cure with ultraviolet radiation.

3. The method as defined in claim 1 wherein an organic peroxide curing catalyst is added to said centrifuged dispersion prior to casting said film.

4. The method as defined in claim 3 wherein said curing is effected by heating said film to a temperature within the range of from about 125° C. to about 180° C.

5. The method as defined in claim 1 wherein said curing is effected by subjecting said film to high energy radiation.

6. The method as defined in claim 1 wherein fabric reinforcement is added to said film prior to evaporating the solvent therefrom.

7. The method as defined in claim 1 wherein said reinforcing filler material is silica.

8. The method as defined in claim 1 wherein said releasable carrier substrate is aluminum foil.

9. The method as defined in claim 1 wherein said centrifuging is carried out at 10,000 g. for a period ranging from about 30 minutes to about 20 hours.

10. The method as defined in claim 1 wherein said film is cast in two layers, further comprising evaporating the solvent from the first layer, casting the second layer, evaporating the solvent from said second layer, and curing said first and second layers together.

References Cited

UNITED STATES PATENTS

| | | | |
|---|---|---|---|
| 2,778,793 | 1/1957 | Thomas et al. | 264—22 |
| 2,934,464 | 4/1960 | Hoffman et al. | 260—33.6 SB |
| 3,579,469 | 5/1971 | Grenoble | 260—33.6 SB |
| 3,585,065 | 6/1971 | Johnson | 260—33.6 SB |
| 3,691,128 | 9/1972 | Vincent | 260—33.6 SB |
| 3,714,288 | 1/1973 | Nordstrom | 260—33.6 SB |

ROBERT F. WHITE, Primary Examiner

G. AUVILLE, Assistant Examiner

U.S. Cl. X.R.

128—142.2; 260—33.6 SB, 34.2; 264—213